(12) United States Patent
Smith et al.

(10) Patent No.: US 8,574,704 B2
(45) Date of Patent: Nov. 5, 2013

(54) LIQUID-IMPREGNATED SURFACES, METHODS OF MAKING, AND DEVICES INCORPORATING THE SAME

(75) Inventors: J. David Smith, Cambridge, MA (US); Rajeev Dhiman, Malden, MA (US); Kripa K. Varanasi, Lexington, MA (US); Ernesto Reza-Garduño Cabello, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 13/586,945

(22) Filed: Aug. 16, 2012

(65) Prior Publication Data

US 2013/0034695 A1    Feb. 7, 2013

Related U.S. Application Data

(63) Continuation of application No. 13/302,356, filed on Nov. 22, 2011.

(60) Provisional application No. 61/515,395, filed on Aug. 5, 2011.

(51) Int. Cl.
*B32B 1/00* (2006.01)

(52) U.S. Cl.
USPC .................................... 428/143; 428/141

(58) Field of Classification Search
USPC .................................. 428/141–144
See application file for complete search history.

(56) References Cited

U.S. PATENT DOCUMENTS

| | | | |
|---|---|---|---|
| 4,069,933 A | 1/1978 | Newing | |
| 5,624,713 A | 4/1997 | Ramer | |
| 7,458,384 B1* | 12/2008 | Seal et al. | 137/13 |
| 8,252,259 B2* | 8/2012 | Seal et al. | 423/263 |
| 2002/0164443 A1 | 11/2002 | Oles et al. | |
| 2003/0096083 A1 | 5/2003 | Morgan et al. | |
| 2005/0016489 A1 | 1/2005 | Endicott et al. | |
| 2005/0112326 A1 | 5/2005 | Nun et al. | |
| 2006/0013735 A1 | 1/2006 | Engelking et al. | |

(Continued)

FOREIGN PATENT DOCUMENTS

| | | |
|---|---|---|
| CN | 101269960 B | 5/2011 |
| DE | 198 18 956 A1 | 11/1998 |

(Continued)

OTHER PUBLICATIONS

International Search Report of PCT/US12/30370, dated Oct. 15, 2012, 6 pages.

(Continued)

*Primary Examiner* — Maria Veronica Ewald
*Assistant Examiner* — Nathan Van Sell
(74) *Attorney, Agent, or Firm* — Choate, Hall & Stewart LLP

(57) ABSTRACT

The invention is directed to an article with a liquid-impregnated surface, the surface having a matrix of features thereupon, spaced sufficiently close to stably contain a liquid therebetween or therewithin, and preferable also a thin film thereupon. The surface provides the article with advantageous non-wetting properties. Compared to previous non-wetting surfaces, which include a gas (e.g., air) entrained within surface textures, these liquid-impregnated surfaces are resistant to impalement and frost formation, and are therefore more robust.

18 Claims, 14 Drawing Sheets

(56) References Cited

U.S. PATENT DOCUMENTS

| | | | |
|---|---|---|---|
| 2006/0147675 | A1 | 7/2006 | Nun et al. |
| 2008/0213461 | A1* | 9/2008 | Gill et al. .................. 427/2.3 |
| 2009/0155609 | A1 | 6/2009 | Gentleman et al. |
| 2010/0092621 | A1 | 4/2010 | Akutsu et al. |
| 2011/0077172 | A1 | 3/2011 | Aizenberg et al. |
| 2012/0036846 | A1 | 2/2012 | Aizenberg et al. |

FOREIGN PATENT DOCUMENTS

| | | | |
|---|---|---|---|
| JP | 1 170932 | A | 7/1989 |
| JP | 5 240251 | A | 9/1993 |
| JP | 2004 037764 | A | 2/2004 |
| WO | WO-93/17077 | A1 | 9/1993 |
| WO | WO-99/36490 | A1 | 7/1999 |
| WO | WO-2006/091235 | A1 | 8/2006 |
| WO | WO-2007/019362 | A1 | 2/2007 |
| WO | WO-2008/111603 | A1 | 9/2008 |
| WO | WO-2010/129807 | A1 | 11/2010 |
| WO | WO-2011/087458 | A1 | 7/2011 |
| WO | WO-2012/100099 | A2 | 7/2012 |
| WO | WO-2012/100100 | A2 | 7/2012 |

OTHER PUBLICATIONS

Written Opinion of PCT/US12/30370, dated Oct. 15, 2012, 10 pages.
Holden et al., The Use of Organic Coatings to Promote Dropwise Condensation of Steam, Journal of Heat Transfer; 109: 768-774 (1987).
Lafuma et al., Slippery Pre-Suffused Surfaces, A Letters Journal Exploring the Frontiers of Physics, 96: 58001p1-56001p4 (2011).
Liu et al., Metallic Surfaces with Spacial Wettability, Nanoscale, 3:825-238 (2011).
Quere et al., Non-Sticking Drops, Reports on Progress in Physics, 68: 2495-2532 (2005).
Rausch et al., On the Characteristics of Ion Implanted Metallic Surgaces Inducing Dropwise Condensation of Steam, Langmuir, 26(8): 5971-5975 (2010).
Varanasi et al., Spatial Control irt the Heterogeneous Nucleation of Water, Applied Physics Letters, 95: 094101-01-03 (2009).
Zhao et al., Dropwise condensation of Steam on Ion Implanted Condenser Surfaces, Heat Recovery Systems & CHP, 14(5): 525-534 (1994).
Cao et al., Anti-Icing Superhydrophobic Coatings, Langmuir Letter, 2009, A-E.
Furmidge, Studies at Phase Interfaces, Journal of Colloid Science, 1962, 17: 309-324.
Jung et al., Are Superhydrophobic Surfaces Best for Icephobicity?, Langmuir, 2001, 27: 3059-3066.
Kulinich et al., Ice Adhesion on Super-Hydrophobic Surfaces, Applied Surface Science, 2009, 225: 8153-8157.
Meuler et al., Exploiting Topographical Texture to Impact Icephobicity, ACS Nano, 2010, 4(12): 7048-7052.
Mishchenko et al., Design of Ice-free Nanostructured Surfaces Based on Repulsion of Impacting Water Droplets, ACS Nano, 2010, 4(12): 7699-7707.
Seiwert et al., Coating of a Textured Solid, J. Fluid Mech., 2011, 669: 55-63.
Song et al., Superhydrophobic Surfaces Produced by Applying a Self-Assembled Monolayer to Silicon Micro/Nano-Textured Surfaces, Nano Research, 2009, 2: 143-150.
Varanasi et al., Frost Formation and Ice Adhesion on Superhydrophobic Surfaces, Applied Physics Letters, 2010, 97: 234102.
International Search Report of PCT/US12/42326 dated Dec. 3, 2012, 4 pages.
Written Opinion of PCT/US12/42326 dated Dec. 3, 2012, 7 pages.
Bauer et al., The insect-trapping rim of *Nepenthes* pitchers: surface structure and function, Plant Signaling & Behavior, 4 (11): 1019-1023 (2009).
Bohn et al., Insect aquaplaning: *Nepenthes* pitcher plants capture prey with the peristome, a fully wettable water-lubricated anisotropic surface, Proceedings of the National Academy of Sciences,14138-14143 (2004).
Cassie et al., Wettability of porous surfaces, Transactions of the Faraday Society, 40: 546-551, (1944).
Hejazi et al., Wetting Transitions in Two-, Three-, and Four-Phase Systems, Langmuir, 28:2173-2180 (2012).
Wenzel, Resistance of Solid Surgaces to Wetting by Water, Industrial & Engineering Chemistry, 28(8): 988-994 (1936).
Wong et al., Bioinspired Self-Repairing Slippery Surfaces with Pressure-Stable Omniphobicity, Nature, 477:443-447 (2011).
International Search Report for PCT/US2011/061898, dated Apr. 24, 2013, 6 pages.
Written Opinion for PCT/US2011/061898, dated Apr. 24, 2013, 9 pages.

* cited by examiner

3D VIEW

TOP VIEW

EQUATIONS ENLARGED FOR CLARITY

NONWETTED STATE 1

$\theta^*_{os(v)} = 0$
$\theta^*_{os(w)} = 0$
$\theta_{os(v)} = 0$
$\theta_{os(w)} = 0$

NONWETTED STATE 3

$\theta^*_{os(v)} = 0$
$\theta^*_{os(w)} = 0$
$\theta_{os(v)} = 0$
$\theta_{os(w)} > 0$

IMPALED STATE 1

$\theta^*_{os(v)} = 0$
$\theta^*_{os(w)} > 0$
$\theta_{os(v)} = 0$
$\theta_{os(w)} > 0$

NONWETTED STATE 2

$\theta^*_{os(v)} = 0$
$\theta^*_{os(w)} = 0$
$\theta_{os(v)} > 0$
$\theta_{os(w)} > 0$

NONWETTED STATE 4

$\theta^*_{os(v)} = 0$
$\theta_{os(v)} > 0$
$\theta^*_{os(w)} = 0$
$\theta_{os(w)} = 0$

IMPALED STATE 2

$\theta^*_{os(v)} = 0$
$\theta_{os(v)} > 0$
$\theta^*_{os(w)} > 0$
$\theta_{os(w)} > 0$

FIG. 17

LIQUID-IMPREGNATED SURFACES, METHODS OF MAKING, AND DEVICES INCORPORATING THE SAME

CROSS-REFERENCE TO RELATED APPLICATION

This application is a continuation of U.S. patent application Ser. No. 13/302,356, filed Nov. 22, 2011, which claims priority to and the benefit of, and incorporates herein by reference in its entirety, U.S. Provisional Patent Application No. 61/515,395, which was filed on Aug. 5, 2011.

TECHNICAL FIELD

This invention relates generally to non-wetting and low adhesion surfaces. More particularly, in certain embodiments, the invention relates to non-wetting surfaces that resist liquid impalement, ice formation, scale formation, hydrate formation, and/or have antifouling properties.

BACKGROUND

The advent of micro/nano-engineered surfaces in the last decade has opened up new techniques for enhancing a wide variety of physical phenomena in thermofluids sciences. For example, the use of micro/nano surface textures has provided nonwetting surfaces capable of achieving less viscous drag, reduced adhesion to ice and other materials, self-cleaning, and water repellency. These improvements result generally from diminished contact (i.e., less wetting) between the solid surfaces and adjacent liquids.

One type of non-wetting surface of interest is a superhydrophobic surface. In general, a superhydrophobic surface includes micro/nano-scale roughness on an intrinsically hydrophobic surface, such as a hydrophobic coating. Superhydrophobic surfaces resist contact with water by virtue of an air-water interface within the micro/nano surface textures.

One of the drawbacks of existing non-wetting surfaces (e.g., superhydrophobic, superoleophobic, and supermetallophobic surfaces) is that they are susceptible to impalement, which destroys the non-wetting capabilities of the surface. Impalement occurs when an impinging liquid (e.g., a liquid droplet or liquid stream) displaces the air entrained within the surface textures. Previous efforts to prevent impalement have focused on reducing surface texture dimensions from micro-scale to nano-scale.

Another drawback with existing non-wetting surfaces is that they are susceptible to ice formation and adhesion. For example, when frost forms on existing superhydrophobic surfaces, the surfaces become hydrophilic. Under freezing conditions, water droplets can stick to the surface, and ice may accumulate. Removal of the ice can be difficult because the ice may interlock with the textures of the surface. Similarly, when these surfaces are exposed to solutions saturated with salts, for example as in desalination or oil and gas applications, scale builds on surfaces and results in loss of functionality. Similar limitations of existing non-wetting surfaces include problems with hydrate formation, and formation of other organic or inorganic deposits on the surfaces.

There is a need for non-wetting surfaces (e.g., superhydrophobic surfaces, superoleophobic surfaces, and supermetallophobic surfaces) that are more robust. In particular, there is a need for non-wetting surfaces that resist impalement and ice formation.

SUMMARY OF THE INVENTION

Described herein are non-wetting surfaces that include a liquid impregnated within a matrix of micro/nano-engineered features on the surface, or a liquid filling pores or other tiny wells on the surface. Compared to previous non-wetting surfaces, which include a gas (e.g., air) entrained within the surface textures, these liquid-impregnated surfaces are resistant to impalement and frost formation, and are therefore more robust. The invention is fundamental in nature and can be used in any application that benefits from non-wetting surfaces. For example, the methods described herein may be used to reduce viscous drag in oil and gas pipelines, prevent ice formation on aircraft and/or powerlines, and minimize the accumulation of impinging liquids.

The methods and apparatus described herein have several advantages over existing non-wetting surfaces, referred to herein as gas-impregnated surfaces. For example, compared to gas-impregnated surfaces, liquid-impregnated surfaces have a much higher resistance to impalement. This enables a liquid-impregnated surface to withstand higher pressures (e.g., higher droplet velocities) during liquid impingement. In certain embodiments, a liquid-impregnated surface resists impalement through the use of micro-scale surface textures, rather than nano-scale textures, as utilized in previous gas-impregnated surface approaches. The use of micro-scale textures, rather than nano-scale textures is extremely advantageous at least because micro-scale features are less expensive and much easier to fabricate.

Through proper selection of the impregnating liquid, the liquid-impregnated surfaces described herein are easily customizable to suit a wide variety of applications. For example, water drag reduction on a solid surface may be achieved with the use of oil as the impregnating liquid, because water slips readily on oils. The use of oil as the impregnating liquid is also suitable for the prevention of frost and ice formation. In this application, the frost and ice may form only on the peaks of the surface textures, thereby greatly reducing ice formation rates and adhesion strengths.

In one aspect, the invention is directed to an article comprising a liquid-impregnated surface, said surface comprising a matrix of features spaced sufficiently close to stably contain a liquid therebetween or therewithin. In certain embodiments, the liquid has viscosity at room temperature no greater than about 1000 cP (or cSt), no greater than about 100 cP (or cSt), or no greater than about 50 cP (or cSt). In certain embodiments, the liquid has vapor pressure at room temperature no greater than about 20 mm Hg, no greater than about 1 mm Hg, or no greater than about 0.1 mmHg.

In certain embodiments, the features have substantially uniform height and wherein the liquid fills space between the features and coats the features with a layer at least about 5 nm in thickness over the top of the features. In certain embodiments, the features define pores or other wells and the liquid fills the features.

In certain embodiments, the liquid has receding contact angle of 0° such that the liquid forms a stable thin film on the top of the features.

In certain embodiments, the matrix has a feature-to-feature spacing from about 1 micrometer to about 100 micrometers. In certain embodiments, the matrix has a feature-to-feature spacing from about 5 nanometers to about 1 micrometer. In certain embodiments, the matrix comprises hierarchical structures. For example, the hierarchical structures may be micro-scale features that comprise nano-scale features thereupon.

In certain embodiments, the features have height no greater than about 100 micrometers. In certain embodiments, the features are posts. In certain embodiments, the features include one or more spherical particles, nanoneedles, nanograss, and/or random geometry features that provides surface roughness. In certain embodiments, the feature comprises one or more pores, cavities, interconnected pores, and/or interconnected cavities. In certain embodiments, the surface comprises porous media with a plurality of pores having different sizes.

In certain embodiments, the liquid comprises a perfluorocarbon liquid, a perfluoroFluorinated vacuum oil (such as Krytox 1506 or Fromblin 06/6), a fluorinated coolant (e.g., perfluoro-tripentylamine sold as FC-70, manufactured by 3M), an ionic liquid, a fluorinated ionic liquid that is immiscible with water, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and/or a bodily fluid.

In certain embodiments, the article is a steam turbine part, a gas turbine part, an aircraft part, or a wind turbine part, and the liquid-impregnated surface is configured to repel impinging liquid. In certain embodiments, the article is eyeglasses, goggles, a ski mask, a helmet, a helmet face shield, or a mirror, and the liquid-impregnated surface is configured to inhibit fogging thereupon. In certain embodiments, the article is an aircraft part, a wind turbine part, a power transmission line, or a windshield, and the liquid-impregnated surface is configured to inhibit formation of ice thereupon. In certain embodiments, the article is a pipeline (or a part or coating thereof), and the liquid-impregnated surface is configured to inhibit the formation of hydrate thereupon and/or enhance the slippage (reduce drag) of fluid flowing thereupon (or therethrough). In certain embodiments, the article is a heat exchanger part or an oil or gas pipeline (or a part or coating thereof), and the liquid-impregnated surface is configured to inhibit the formation and/or adhesion of salt thereupon. In certain embodiments, the liquid-impregnated surface is configured to inhibit corrosion.

In certain embodiments, the article is an artificial joint and the liquid-impregnated surface is configured to reduce friction between mating surfaces and/or provide long-lasting lubrication of the joint. In certain embodiments, the article is an engine part (e.g., piston or cylinder), and the liquid-impregnated surface is configured to provide long-lasting lubrication of the part. In certain embodiments, the liquid-impregnated surface is configured to release liquid from the surface over time, thereby providing lubrication over time.

In certain embodiments, the liquid-impregnated surface is an anti-fouling surface configured to resist adsorption of debris thereupon. In certain embodiments, the article is a heat exchanger part, and the liquid-impregnated surface is configured to facilitate shedding of condensate thereupon, thereby enhancing condensation heat transfer.

BRIEF DESCRIPTION OF THE DRAWINGS

The objects and features of the invention can be better understood with reference to the drawing described below, and the claims.

FIG. 17 is a schematic showing conditions for the six liquid-impregnated surface wetting states shown in FIG. 16, in accordance with certain embodiments of the invention.

DESCRIPTION

Figure 1A:
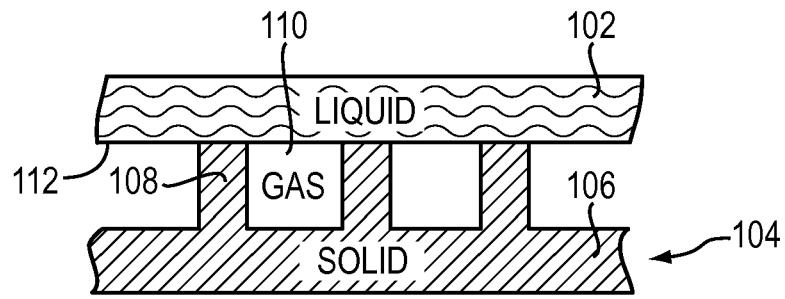
FIG. 1a is a schematic cross-sectional view of a liquid contacting a non-wetting surface, in accordance with certain embodiments of the invention.

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where articles, devices and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

Similarly, where articles, devices, mixtures, and compositions are described as having, including, or comprising specific compounds and/or materials, it is contemplated that, additionally, there are articles, devices, mixtures, and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

In certain embodiments, a static contact angle θ between a liquid and solid is defined as the angle formed by a liquid drop on a solid surface as measured between a tangent at the contact line, where the three phases—solid, liquid, and vapor—meet, and the horizontal. The term "contact angle" usually implies the static contact angle θ since the liquid is merely resting on the solid without any movement.

As used herein, dynamic contact angle, $\theta_d$, is a contact angle made by a moving liquid on a solid surface. In the context of droplet impingement, $\theta_d$ may exist during either advancing or receding movement.

As used herein, a surface is "non-wetting" if it has a dynamic contact angle with a liquid of at least 90 degrees. Examples of non-wetting surfaces include, for example, superhydrophobic surfaces, superoleophobic surfaces, and supermetallophobic surfaces.

As used herein, contact angle hysteresis (CAH) is CAH=$\theta_a$−$\theta_r$, where $\theta_a$ and $\theta_r$ are advancing and receding contact angles, respectively, formed by a liquid on a solid surface. The advancing contact angle $\theta_a$ is the contact angle formed at the instant when a contact line is about to advance, whereas the receding contact angle $\theta_r$ is the contact angle formed when a contact line is about to recede.

FIG. 1a is a schematic cross-sectional view of a contacting liquid 102 in contact with a traditional or previous non-wetting surface 104 (i.e., a gas impregnating surface), in accordance with one embodiment of the invention. The surface 104 includes a solid 106 having a surface texture defined by posts 108. The regions between the posts 108 are occupied by a gas 110, such as air. As depicted, while the contacting liquid 102 is able to contact the tops of the posts 108, a gas-liquid interface 112 prevents the liquid 102 from wetting the entire surface 104.

Figure 1B:
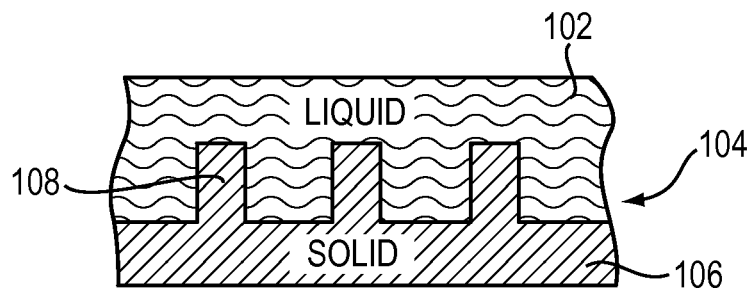
FIG. 1b is a schematic cross-sectional view of a liquid that has impaled a non-wetting surface, in accordance with certain embodiments of the invention.

Referring to FIG. 1b, in certain instances, the contacting liquid 102 may displace the impregnating gas and become impaled within the posts 108 of the solid 106. Impalement may occur, for example, when a liquid droplet impinges the surface 104 at high velocity. When impalement occurs, the gas occupying the regions between the posts 108 is replaced with the contacting liquid 102, either partially or completely, and the surface 104 may lose its non-wetting capabilities.

Figure 1C:
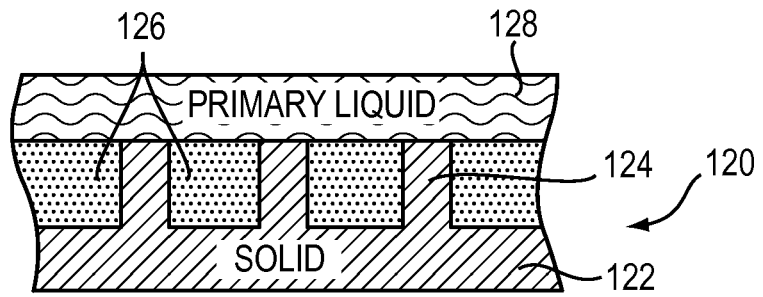
FIG. 1c is a schematic cross-sectional view of a liquid in contact with a liquid-impregnated surface, in accordance with certain embodiments of the invention.

Referring to FIG. 1c, in certain embodiments, a non-wetting, liquid-impregnated surface 120 is provided that includes a solid 122 having textures (e.g., posts 124) that are impregnated with an impregnating liquid 126, rather than a gas. In the depicted embodiment, a contacting liquid 128 in contact with the surface, rests on the posts 124 (or other texture) of the surface 120. In the regions between the posts 124, the contacting liquid 128 is supported by the impregnating liquid 126. In certain embodiments, the contacting liquid 128 is immiscible with the impregnating liquid 126. For example, the contacting liquid 128 may be water and the impregnating liquid 126 may be oil.

The solid 122 may include any intrinsically hydrophobic, oleophobic, and/or metallophobic material or coating. For example, the solid 122 may include: hydrocarbons, such as alkanes, and fluoropolymers, such as teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and/or other fluoropolymers. Additional possible materials or coatings for the solid 122 include: ceramics, polymeric materials, fluorinated materials, intermetallic compounds, and composite materials. Polymeric materials may include, for example, polytetrafluoroethylene, fluoroacrylate, fluoroeurathane, fluorosilicone, fluorosilane, modified carbonate, chlorosilanes, silicone, polydimethylsiloxane (PDMS), and/or combinations thereof. Ceramics may include, for example, titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof.

The textures within the liquid-impregnated surface 120 are physical textures or surface roughness. The textures may be random, including fractal, or patterned. In certain embodiments, the textures are micro-scale or nano-scale features. For example, the textures may have a length scale L (e.g., an average pore diameter, or an average protrusion height) that is less than about 100 microns, less than about 10 microns, less than about 1 micron, less than about 0.1 microns, or less than about 0.01 microns. In certain embodiments, the texture includes posts 124 or other protrusions, such as spherical or hemispherical protrusions. Rounded protrusions may be preferable to avoid sharp solid edges and minimize pinning of liquid edges. The texture may be introduced to the surface using any conventional method, including mechanical and/or chemical methods such as lithography, self-assembly, and deposition, for example.

The impregnating liquid 126 may be any type of liquid that is capable of providing the desired non-wetting properties. For example, the impregnating liquid 126 may be oil-based or water-based (i.e., aqueous). In certain embodiments, the impregnating liquid 126 is an ionic liquid (e.g., BMI-IM). Other examples of possible impregnating liquids include hexadecane, vacuum pump oils (e.g., FOMBLIN® 06/6, KRYTOX® 1506) silicon oils (e.g., 10 cSt or 1000 cSt), fluorocarbons (e.g., perfluoro-tripentylamine, FC-70), shear-thinning fluids, shear-thickening fluids, liquid polymers, dissolved polymers, viscoelastic fluids, and/or liquid fluoroPOSS. In certain embodiments, the impregnating liquid is (or comprises) a liquid metal, a dielectric fluid, a ferro fluid, a magneto-rheological (MR) fluid, an electro-rheological (ER) fluid, an ionic fluid, a hydrocarbon liquid, and/or a fluorocarbon liquid. In one embodiment, the impregnating liquid 126 is made shear thickening with the introduction of nano particles. A shear-thickening impregnating liquid 126 may be desirable for preventing impalement and resisting impact from impinging liquids, for example.

To minimize evaporation of the impregnating liquid 126 from the surface 120, it is generally desirable to use impregnating liquids 126 that have low vapor pressures (e.g., less than 0.1 mmHg, less than 0.001 mmHg, less than 0.00001 mmHg, or less than 0.000001 mmHg). In certain embodiments, the impregnating liquid 126 has a freezing point of less than −20° C., less than −40° C., or about −60° C. In certain embodiments, the surface tension of the impregnating liquid 126 is about 15 mN/m, about 20 mN/m, or about 40 mN/m. In certain embodiments, the viscosity of the impregnating liquid 126 is from about 10 cSt to about 1000 cSt).

The impregnating liquid 126 may be introduced to the surface 120 using any conventional technique for applying a liquid to a solid. In certain embodiments, a coating process, such as a dip coating, blade coating, or roller coating, is used to apply the impregnating liquid 126. Alternatively, the impregnating liquid 126 may be introduced and/or replenished by liquid materials flowing past the surface 120 (e.g., in a pipeline). After the impregnating liquid 126 has been applied, capillary forces hold the liquid in place. Capillary forces scale roughly with the inverse of feature-to-feature distance or pore radius, and the features may be designed such that the liquid is held in place despite movement of the surface and despite movement of air or other fluids over the surface (e.g., where the surface 120 is on the outer surface of an aircraft with air rushing over, or in a pipeline with oil and/or other fluids flowing therethrough). In certain embodiments, nano-scale features are used (e.g., 1 nanometer to 1 micrometer) where high dynamic forces, body forces, gravitational forces, and/or shearing forces could pose a threat to remove the liquid film, e.g., for surfaces used in fast flowing pipelines, on airplanes, on wind turbine blades, etc. Small features may also be useful to provide robustness and resistance to impact.

Compared to gas-impregnated surfaces, the liquid-impregnated surfaces described herein offer several advantages. For example, because liquids are incompressible over a large range of pressures, liquid-impregnated surfaces are generally more resistant to impalement. In certain embodiments, while nano-scale (e.g., less than one micron) textures may be necessary to avoid impalement with gas-impregnated surfaces, micro-scale (e.g., from 1 micron to about 100 microns) textures are sufficient for avoiding impalement with liquid-impregnated surface. As mentioned, micro-scale textures are much easier to manufacture and more practical than nano-scale textures.

Liquid-impregnated surfaces are also useful for reducing viscous drag between a solid surface and a flowing liquid. In general, the viscous drag or shear stress exerted by a liquid flowing over a solid surface is proportional to the viscosity of the liquid and the shear rate adjacent to the surface. A traditional assumption is that liquid molecules in contact with the solid surface stick to the surface, in a so-called "no-slip" boundary condition. While some slippage may occur between the liquid and the surface, the no-slip boundary condition is a useful assumption for most applications.

In certain embodiments, non-wetting surfaces, such as liquid-impregnated surfaces, are desirable as they induce a large amount of slip at the solid surface. For example, referring again to FIGS. 1a and 1c, when a contacting liquid 102, 128 is supported by an impregnating liquid 126 or a gas, the liquid-liquid or liquid-gas interface is free to flow or slip with respect to the underlying solid material. Drag reductions of as much as 40% may be achieved due to this slippage. As mentioned, however, gas-impregnated surfaces are susceptible to impalement. When impalement occurs with a gas-impregnated surface, the benefits of reduced drag reduction may be lost.

Another advantage of the liquid-impregnated surfaces described herein is that they are useful for minimizing the formation and adhesion of frost or ice. In theory, previous (i.e., gas-impregnated) superhydrophobic surfaces, reduce ice formation and adhesion by forcing the ice to rest atop low surface energy, micro- and/or nanoscale surface textures, so that the ice contacts mostly air. In practice, however, these gas-impregnated surfaces can actually result in increased formation and adhesion of ice. For example, when the temperature of the gas-impregnated surface is brought below freezing, the gas-impregnated surface may begin to accumulate frost, which converts the surface from superhydrophobic to hydrophilic. When water contacts the now hydrophilic surface, the water may infiltrate the hydrophilic textures and freeze. The adhesive bond between the gas-impregnated surface and the ice may be strengthened by interlocking between the ice and the surface textures. Similarly, the liquid-impregnated surfaces described herein are useful in situations where nucleation on the surface poses a problem, for example, to reduce scaling, hydrate-formation, plaque build-up on surgical implants, and the like.

According to classical nucleation theory, clusters of water molecules gathered together under random thermal motion must reach a critical size in order to sustain growth. The free energy barrier, $\Delta G^*$, to the heterogeneous nucleation of an embryo of critical size on a flat surface, and the corresponding nucleation rate are expressed as $$\Delta G^* = \frac{\pi \sigma_{IV} r_c^2}{3}(2 - 3m + m^3) \quad (1)$$

and $$J = J_0 \exp(\Delta G^* / kT). \quad (2)$$

The parameter m is the ratio of the interfacial energies given by $$m = \frac{(\sigma_{SV} - \sigma_{SI})}{\sigma_{IV}}, \quad (3)$$

where $\sigma_{SV}$, $\sigma_{SI}$ and $\sigma_{IV}$ are the interfacial energies for the substrate-vapor, substrate-ice, and ice-vapor interfaces, respectively. In defining the free energy in terms of a critical radius $r_c$, the substrate and the ice are assumed to be isotropic, and the nucleating particles are assumed to be spherical. The critical radius $r_c$ can then be defined by the Kelvin equation:

$$\ln(p/p_o) = 2\sigma_{IV}/n_l kTr_c. \quad (4)$$

Nucleation experiments on solids demonstrate much lower energy barriers to nucleation than the free energy barrier predicted by Equation 1. This is likely due to nanoscale heterogeneity and roughness, as high surface energy patches of a surface and nanoscale concavities may act as nucleation sites. Liquids, however, are commonly very smooth and homogeneous, and nucleation of water on liquids has been shown experimentally to agree well with classical theory. Consequently, the energy barrier to frost nucleation or condensation is generally much higher for hydrophobic liquids than it is for solids. In certain embodiments, impregnating a liquid within the textures of a liquid-impregnated surface prevents nucleation in these regions and forces preferential nucleation on the peaks of the surfaces textures (e.g., the tops of posts). With respect to ice formation, use of a liquid-impregnated surface overcomes or reduces the ice formation and adhesion challenges encountered with gas-impregnated, superhydrophobic surfaces.

In certain embodiments, the liquid-impregnated surfaces described herein have advantageous droplet roll-off properties that minimize the accumulation of liquid or ice layers on the surfaces. To prevent ice formation, for example, it is important for a surface to be able to shed super-cooled droplets (e.g., freezing rain) before the droplets freeze. Otherwise, droplets with sufficiently high velocity (such as a rain droplet) may penetrate the textures of a surface and remain pinned until ice is formed. Advantageously, in certain embodiments, the liquid-impregnated surfaces described herein have low roll-off angles (i.e., the angle or slope of a surface at which a droplet in contact with the surface will begin to roll or slide off the surface). The low roll-off angles associated with liquid-impregnated surfaces allow droplets in contact with the surface to easily roll off the surface before the liquid can freeze and ice can accumulate. As described in more detail below, the roll-off angle for water one surface (i.e., an octadecyl-trichlorosilane-treated silicone post surface impregnated with hexadecane) was measured to be 1.7°±0.1°. In certain embodiments, the roll-off angle for a liquid-impregnated surface is less than about 2°, or less than about 1°.

FIG. 2 is a schematic cross-sectional view of a liquid droplet 202 resting on a liquid-impregnated surface 204, in accordance with certain embodiments of the invention. In one embodiment, the morphology of the droplet edge, which governs its mobility, is affected by the properties of the impregnating liquid 126. For example, as depicted, the droplet may "pick up" the impregnating liquid 126 locally near the droplet edges. The pooling of impregnating liquid 126 at the edges of the droplet gives rise to pinning forces. During droplet roll-off, the pinning forces and viscous forces resist droplet movement due to gravity. For a surface tilted at an angle $\alpha$, the force balance equation for droplet roll-off is given by $$V\rho g \sin \alpha = \pi r^2 (1-\phi) \mu v_o/h + 2r\sqrt{\phi}\gamma_w(\cos \theta_r - \cos \theta_a), \quad (5)$$

where $V\rho g \sin \alpha$ is the gravity force on the droplet, $\pi r^2(1-\phi)\mu v_o/h$ is the viscous force, and $2r\sqrt{\phi}\gamma_w(\cos \theta_r - \cos \theta_a)$ is the pinning force. In this equation, V is droplet volume, $\rho$ is the density of the non-wetted liquid, $\phi$ is surface solid fraction (area fraction of the substrate in direct contact with the non-wetted phase), $\mu$ is dynamic viscosity of the impregnated liquid, $v_o$ is droplet sliding velocity (characteristic drop velocity), h is a characteristic length scale over whish shearing of the impregnated liquid occurs (e.g., a height of surface posts or other surface texture height), $\alpha$ is the angle the substrate makes with respect to the horizontal, g is the acceleration of gravity, r is the contact radius of the non-wetted droplet, $\theta_a$ and $\theta_r$ are the advancing and receding contact angles of the non-wetted droplet, and $\gamma_w$ is the surface energy of the non-wetted liquid in equilibrium with vapor.

Figure 2A:
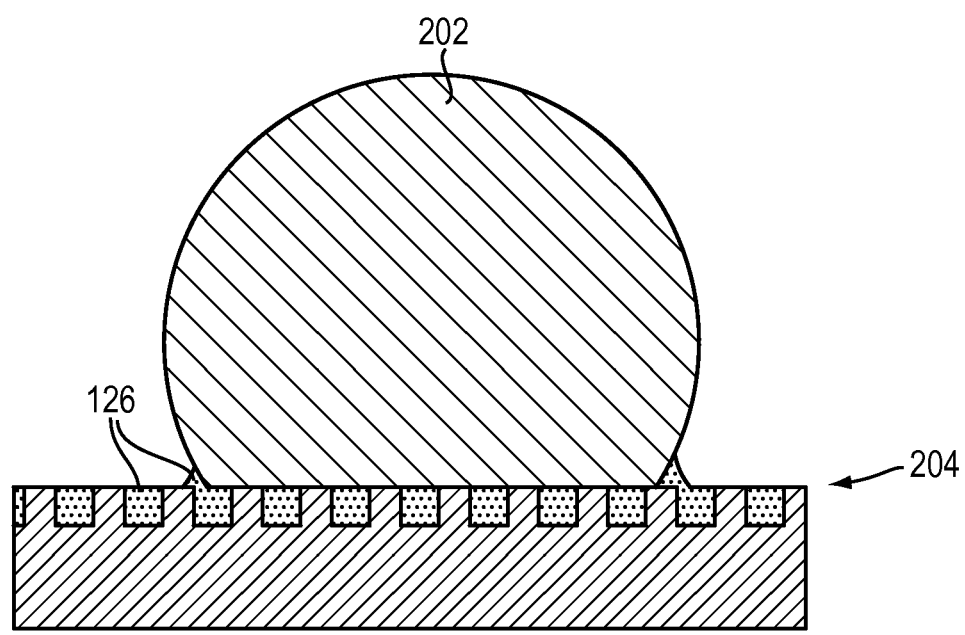
FIG. 2a is a schematic cross-sectional view of a droplet resting on a liquid-impregnated surface, in accordance with certain embodiments of the invention.
Figure 2B:
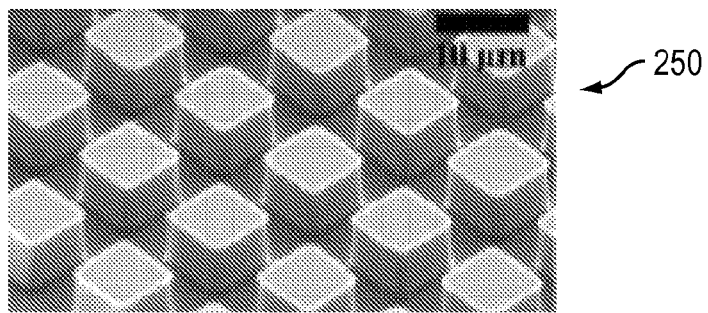
FIG. 2b is an SEM image of a non-wetting surface that includes posts, in accordance with certain embodiments of the invention.
Figure 2C:
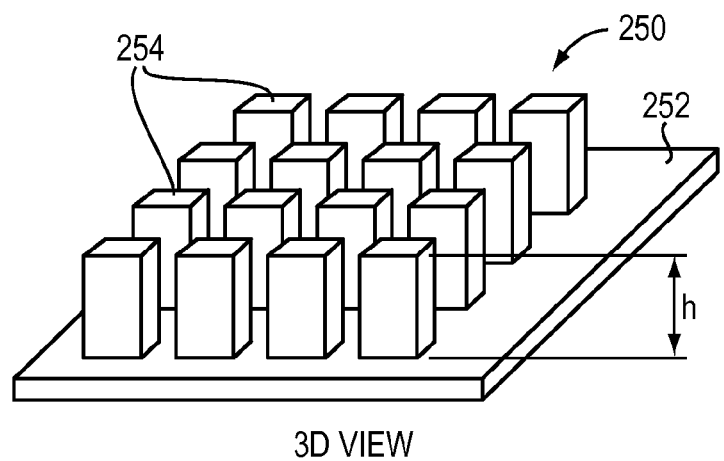
FIG. 2c is a schematic perspective view of a non-wetting surface that includes posts, in accordance with certain embodiments of the invention.
Figure 2D:
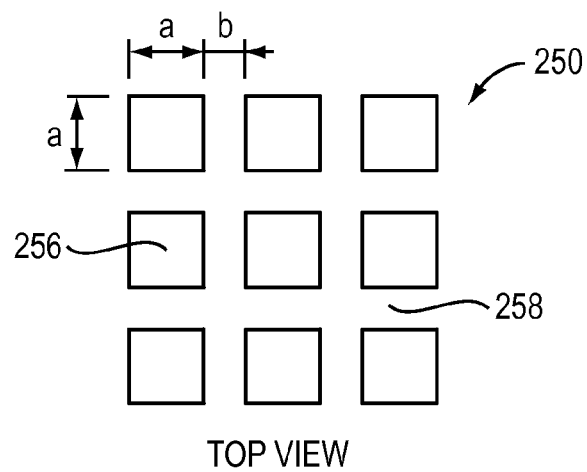
FIG. 2d is a schematic top, cross-sectional view of a non-wetting surface that includes posts, in accordance with certain embodiments of the invention.

FIGS. 2b through 2d depict a non-wetting surface 250 that includes a base portion 252 and an array of substantially square posts 254, which have post tops 256. As shown, the posts 254 have a height h, a side length a, and a post spacing b (i.e., a distance between adjacent post surfaces). The base portion 252 includes base regions 258 between the posts 260. The surface solid fraction $\phi$ for the surface 250 is given by $\phi = a^2/(a+b)^2$.

In certain embodiments, the choice of impregnating liquid influences the speed with which droplet roll-off occurs. For example, if the liquid has a high viscosity, roll-off may occur very slowly.

The liquid-impregnated surfaces described herein have a wide variety of applications across many different industries. For example, in certain embodiments, the liquid-impregnated surfaces are used to repel liquids. There are many physical processes that involve impingement of liquids on solid surfaces. Examples include water droplets impinging steam turbine blades, oil droplets impinging gas turbine blades, and rain droplets impinging aircraft and wind turbine surfaces. For steam and gas turbines, water droplets entrained in steam impinge on and stick to turbine blades, thereby reducing turbine power output. By applying a liquid-impregnated surface to the turbine blades, however, droplets can be shed off the blades and turbine power output can be significantly improved. In one embodiment, liquid-impregnated surfaces present a large energy barrier to condensation and are suitable as anti-fogging coatings for surfaces such as windows, glasses, and/or mirrors.

In certain embodiments, liquid-impregnated surfaces are used to provide ice-phobicity, thereby preventing or minimizing the formation of ice. Ice may form on surfaces in many situations, such as aircraft, wind turbines, power transmission lines, and windshields. Ice formed on liquid-impregnated surfaces exhibits much lower adhesion compared to ordinary surfaces and therefore can easily be removed resulting into significant energy savings. Liquid-impregnated surfaces are also ice-repellent in the sense that their atomically smooth and low energy surface results in a large energy barrier to desublimation (frost formation). In certain embodiments, liquid-impregnated surfaces inhibit macroscopic ice formation from freezing rain. For aircraft, since the liquid-impregnating surfaces result in diminished ice and frost adhesion, the energy and environmentally harmful chemicals required to device aircraft can be significantly reduced. When liquid-impregnated surfaces are used on power transmission lines, ice is less likely to form and can be more easily removed. Liquid-impregnated surfaces can also significantly reduce ice formation on wind turbines, thereby increasing turbine efficiency.

In certain embodiments, liquid-impregnated surfaces are used to provide hydrate-phobicity, thereby preventing or minimizing the formation of hydrates. Hydrates form in oil and gas pipelines during deep-sea drilling and/or extraction. Hydrates can plug pipelines and cause a catastrophic rise in liquid pressures. By choosing a suitable impregnating liquid, a liquid-impregnated surface presents a high energy barrier to nucleation of hydrates and thus resists hydrate formation. Furthermore, hydrates formed on liquid-impregnated surfaces show much lower adhesion strength compared to ordinary surfaces and hence can be easily removed. In certain embodiments, the impregnating liquid is a permanent liquid supplied with an original coating. Alternatively, the impregnating liquid may be continuously supplied by oil present in the pipeline.

In certain embodiments, liquid-impregnated surfaces are used to provide salt-phobicity, thereby preventing or minimizing the formation of salts or mineral scale. Salts may form on solid surfaces in water-based or steam-based industrial facilities, such as heat exchangers in power and desalination plants. Salts may also form on the surfaces of oil and gas pipelines. Formation of salts reduces the thermal performance of heat exchangers and also requires expensive maintenance and/or shutdowns. Liquid-impregnated surfaces exhibit a high energy barrier to salt nucleation that resists salt formation and leads to much lower adhesion strength compared to ordinary surfaces, thus facilitating easy removal. The impregnating liquid may be a permanent liquid supplied with an original coating, and/or it may be continuously supplied or replenished by an adjacent liquid phase (e.g., oil present in an oil or gas pipeline).

In certain embodiments, the liquid-impregnated surfaces are used to reduce viscous drag between a solid surface and a flowing liquid. Many engineering applications, such as the transportation of crude oil in pipelines, require transport of liquids through pipes over long distances. Due to drag forces between the liquids and adjacent surfaces, the energy consumption associated with the transport of these liquids is often significant. Use of liquid-impregnated surfaces may greatly reduce the energy consumption in these applications. By suitably choosing the impregnated liquid, liquid-impregnated surfaces can exhibit enhanced slippage of the contacting liquid and hence lead to a drastic reduction in liquid-solid drag. In certain embodiments, liquid-impregnated surfaces may be effective for use in artificial arteries and/or veins.

In certain embodiments, liquid-impregnated surfaces are useful for inhibiting corrosion. By using a corrosion-resistant impregnating liquid, the underlying solid material may be protected from a corrosive environment. Additionally, the ability of liquid-impregnated surfaces to shed liquid droplets reduces corrosion as moisture is more easily removed from the surface.

Liquid-impregnated surfaces may also be used in stents, artificial arteries, and/or other surgical implants to prevent or reduce deposit build-up thereupon.

In certain embodiments, a liquid-impregnated surface is used to provide self-lubricating bone joints. For example, a liquid-impregnated surface may be used as a material for artificial joints implanted during knee and/or hip replacement surgeries. The liquid-impregnated surface provides significantly reduced friction between mating surfaces and also provides long-lasting lubrication. The impregnating liquid may be a permanent liquid incorporated before implantation, or it may be continuously supplied by lubricating fluids present within the body (e.g., synovial fluid).

There are many other applications in which liquid-impregnated surfaces may be used to provide lubrication. For example, liquid-impregnated surfaces may be used in bearings, on piston/cylinder surfaces, and/or in any other automotive or mechanical devices or equipment where a reduction in friction between adjacent moving surfaces is beneficial. In one embodiment, the impregnating liquid within the surface provides a long-lasting supply of lubricant and hence reduces the time and energy spent in applying lubricant to necessary locations.

Liquid-impregnated surfaces may also be used to provide anti-fouling and/or self-cleaning. For example, liquid-impregnated surfaces may be used for anti-fouling by resisting the adsorption of debris by virtue of their low surface energy. In certain embodiments, particles and chemicals on the liquid-impregnated surface are absorbed and carried away by droplets that are shed from the surface. This self-cleaning property is important for many applications, such as self-cleaning glass (e.g., for windows, glasses, and/or mirrors) and industrial coatings.

Liquid-impregnated surfaces may also be used to promote the condensation of moisture. For example, liquid-impregnated surfaces may be used to shed condensate easily and thereby enhance condensation heat transfer (e.g., drop-wise condensation). In certain embodiments, liquid-impregnated surfaces are applied to heat exchangers, ranging from steam condensers, to HVAC condensers, to natural gas condensers used in liquefying natural gas.

In certain embodiments, the liquid-impregnated surfaces described herein are useful for coatings on sports equipment such as ski glasses/goggles (e.g., antifogging), skis, snowboards, ice skates, swimsuits, and the like.

Figure 15:
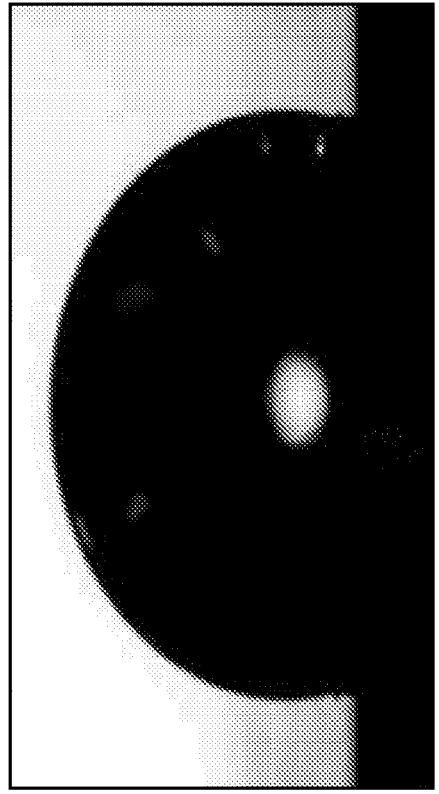
FIG. 15 is an image of a droplet of water on a surface having a matrix of post features and impregnated with silicone oil, contrasting an impaled state with a nonwetted state, in accordance with certain embodiments of the invention.
Figure 15:
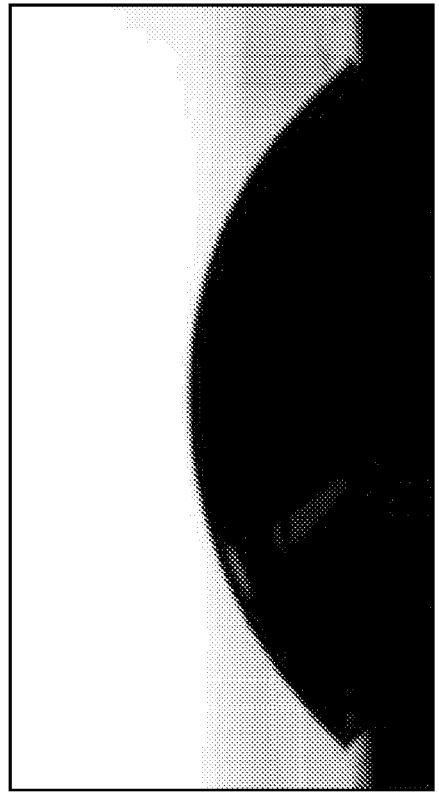

FIG. 15 is an image of a droplet of water on a surface having a matrix of post features and impregnated with silicone oil, contrasting an impaled state with a nonwetted state. In the example showing an impaled state—which may be disfavored for certain embodiments in which an extremely non-wetting surface is desired—the droplet is water, the impregnated liquid is silicone oil, and the surface is untreated silicon with 10 micrometer square posts having 10 micrometer spacing. In the impaled state, liquid does not roll off of the surface. In the example showing a non-wetted state—which is favored for certain embodiments in which non-wetting is desired—the conditions are the same except that the surface is treated with OTS (octadecyltrichlorosilane). Other coatings could be used.

Figure 16:
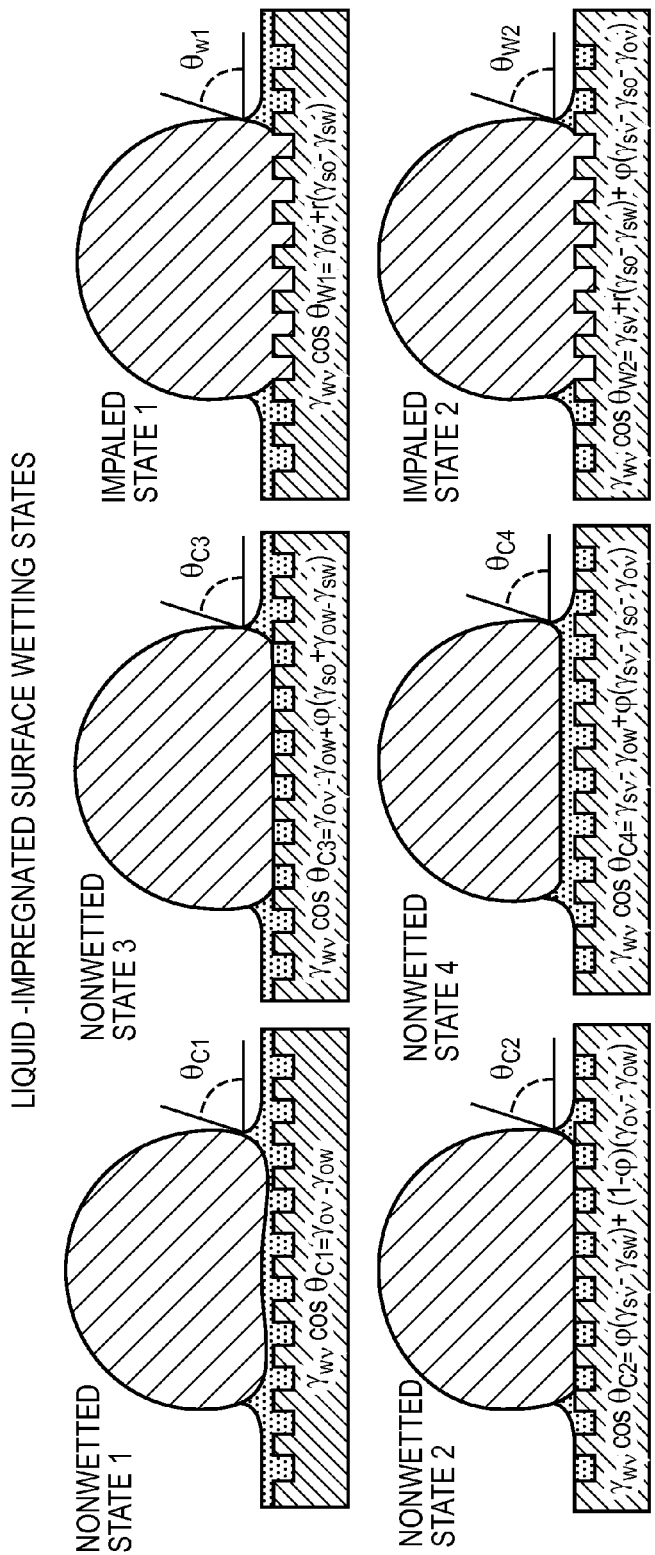
FIG. 16 is a schematic describing six liquid-impregnated surface wetting states, in accordance with certain embodiments of the invention.

FIG. 16 is a schematic describing six liquid-impregnated surface wetting states, in accordance with certain embodiments of the invention. The six surface wetting states (state 1 through state 6) depends on the four wetting conditions shown at the bottom of FIG. 16 (conditions 1 to 4). In most embodiments, the non-wetted states are preferred (states 1 to 4). Additionally, where a thin film stably forms on the tops of the posts (or other features on the surface), as in non-wetted states 1 and 3, even more preferable non-wetting properties (and other related properties described herein) may be observed.

In order to achieve non-wetted states, it is preferable to have low solid surface energy and low surface energy of the impregnated liquid compared to the nonwetted liquid. For example, surface energies below about 25 mJ/m$^2$ are preferred. Low surface energy liquids include certain hydrocarbon and fluorocarbon-based liquids, for example, silicone oil, perfluorocarbon liquids, perfluorinated vacuum oils (e.g., Krytox 1506 or Fromblin 06/6), fluorinated coolants such as perfluoro-tripentylamine (e.g., FC-70, sold by 3M, or FC-43), fluorinated ionic liquids that are immiscible with water, silicone oils comprising PDMS, and fluorinated silicone oils.

Examples of low surface energy solids include the following: silanes terminating in a hydrocarbon chain (such as octadecyltrichlorosilane), silanes terminating in a fluorocarbon chain (e.g. fluorosilane), thiols terminating in a hydrocarbon chain (such butanethiol), and thiols terminating in a fluorocarbon chain (e.g. perfluorodecane thiol). In certain embodiments, the surface comprises a low surface energy solid such as a fluoropolymer, for example, a silsesquioxane such as fluorodecyl polyhedral oligomeric silsesquioxane. In certain embodiments, the fluoropolymer is (or comprises) tetrafluoroethylene (ETFE), fluorinated ethylenepropylene copolymer (FEP), polyvinylidene fluoride (PVDF), perfluoroalkoxytetrafluoroethylene copolymer (PFA), polytetrafluoroethylene (PTFE), tetrafluoroethylene, perfluoromethylvinylether copolymer (MFA), ethylenechlorotrifluoroethylene copolymer (ECTFE), ethylene-tetrafluoroethylene copolymer (ETFE), perfluoropolyether, or Tecnoflon.

In FIG. 16, Gamma_wv is the surface energy of the non-wetted phase in equilibrium with vapor; Gamma_ow is the interfacial energy between the non-wetted phase and the impregnated liquid; Gamma_ov is the surface energy of the impregnated liquid phase in equilibrium with vapor; Gamma_sv is the surface energy of the solid in equilibrium with vapor; Gamma_so is the interfacial energy between the impregnated phase and the solid; Gamma_sw is the interfacial energy between the solid and the non-wetted phase; r=total surface area divided by projected surface area; Theta_c1, Theta_c2, theta_c3, theta_c4, theta_w1, theta_w2, are the macroscopic contact angles made by the non-wetted phase in each wetting state; Theta*_os(v) is the macroscopic contact angle of oil on the textured substrate when the phase surrounding the textured substrate is vapor; Theta_os(v) is the contact angle of oil on a smooth solid substrate of the same chemistry when the phase surrounding the oil droplet is vapor; Theta*_os(w) is the macroscopic contact angle of oil on the textured substrate when the phase surrounding the oil droplet is water; and theta_os(w) is the contact angle of oil on a smooth substrate of the same chemistry as the textured surface when the phase surrounding the oil droplet is water.

FIG. 17 is a schematic showing conditions for the six liquid-impregnated surface wetting states shown in FIG. 16, in accordance with certain embodiments of the invention.

Experimental Examples

Figure 3:
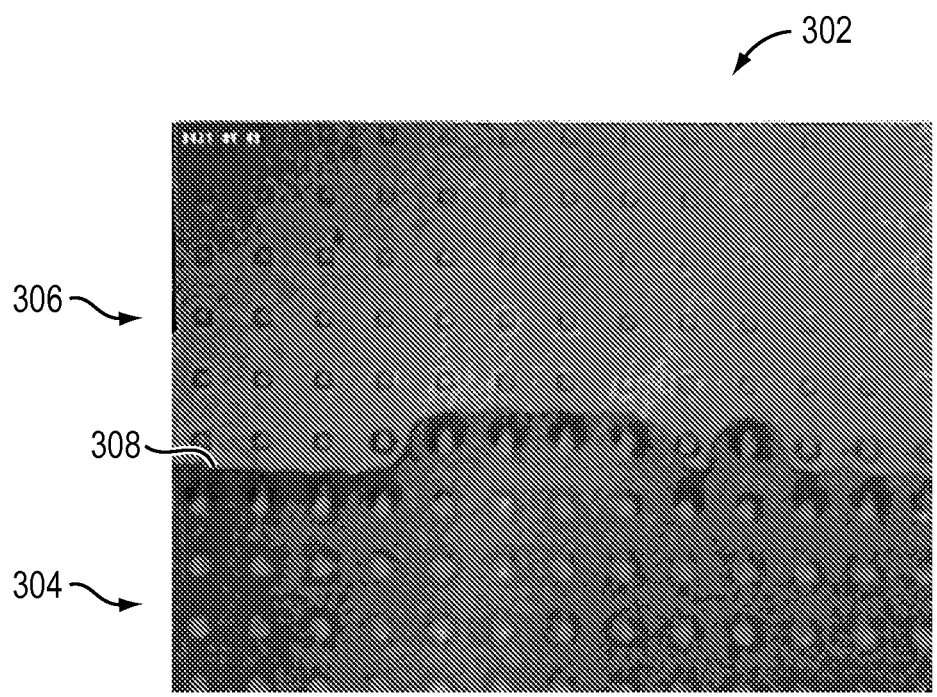
FIG. 3 includes a photograph of a microtextured surface, in accordance with certain embodiments of the invention.

FIG. 3 includes a photograph of a microtextured surface 302, in accordance with certain embodiments of the invention. The surface 302 was made of silicon and includes a square pattern of 10 μm pillars spaced 25 μm apart. As depicted, a bottom portion 304 of the surface 302 was impregnated with hexadecane (an impregnating liquid), while a top portion 306 was impregnated with air (i.e., no impregnating liquid). An edge 308 of the hexadecane defines a boundary between the top portion 306 and the bottom portion 304. Impregnation with hexadecane was achieved by (i) dipping the bottom portion 304 of surface 302 in a bath of hexadecane and (ii) withdrawing the bottom portion 304 from the hexadecane at a slow rate (10 mm/min), with the help of a dip coater. The impregnation was robust as the hexadecane remained in place while being sprayed with water jets having an impact velocity of approximately 5 m/s. Contact angle hysteresis and roll-off angle for a 7 μL water droplet were measured on the bottom portion 304 of the surface 302 (i.e., the liquid-impregnated portion of surface 302). Contact angle hysteresis (CAH) and roll-off angle were both were extremely low: CAH was less than 1° whereas the roll-off angle was only 1.7±0.1°.

Figure 4A:
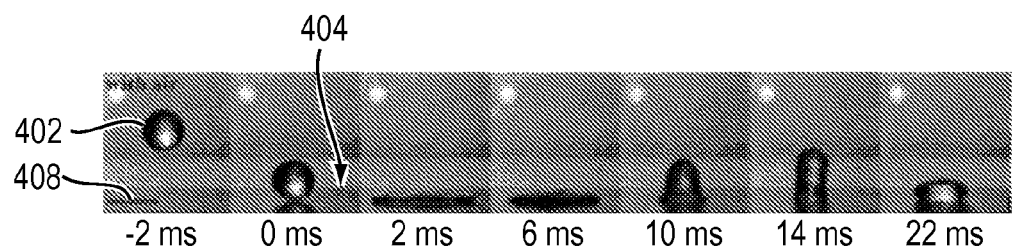
FIGS. 4a and 4b include a sequence of high speed video images depicting the impingement of a water droplet on a gas-impregnated surface and a liquid-impregnated surface, respectively, in accordance with certain embodiments of the invention.
Figure 4B:
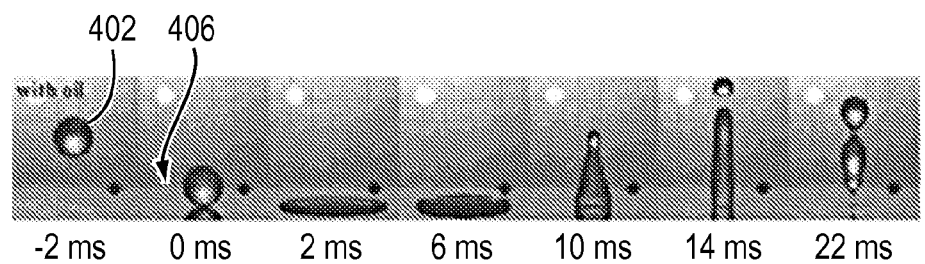

FIGS. 4a and 4b depict a sequence of high speed video images depicting the impingement of a water droplet 402 on a gas-impregnated surface 404 and a liquid-impregnated surface 406, respectively. As discussed above, when a liquid droplet impinges a surface, it can exert large pressures on the surface. This is true even for millimetric sized drops impacting the surface at a velocity less than about 5 m/s. As a result of these pressures, droplets may become impaled on a gas-impregnated surface, thereby causing the gas-impregnated surface to lose its enhanced drop shedding qualities. Droplet impalement is depicted in FIG. 4a in which the droplet is shown to stick to the gas-impregnated surface 404, rather than bounce off of the surface. To prevent sticking, previous approaches with gas-impregnated surfaces emphasize the introduction of texturing at nano-scale. However, with a liquid-impregnated surface approach, even microtextures, on the order of 10 μm, can successfully shed impinging droplets. This is shown in FIG. 4b in which the same microtexture that impaled the water drop when air was present completely repelled the droplet when it was impregnated with hexadecane. The scale bar 408 in these figures is 3 mm.

Figure 5:
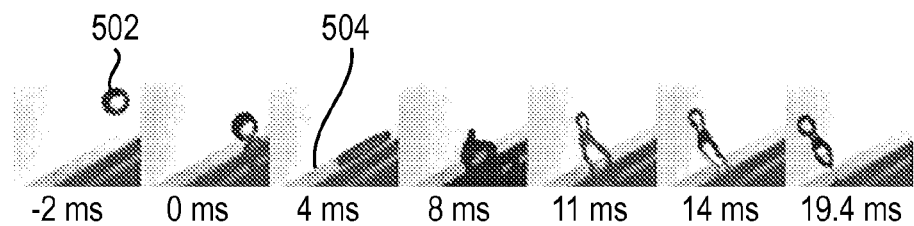
FIG. 5 includes a sequence of high speed video images showing a droplet impacting a liquid-impregnated surface tilted at 25° with respect horizontal, in accordance with certain embodiments of the invention.

FIG. 5 includes a sequence of high speed video images showing a droplet 502 impacting a liquid-impregnated surface 504 tilted at 25° with respect horizontal. The water droplet 502 in this instance slipped and eventually bounced off the surface 504, demonstrating that the liquid-impregnated surface 504 could shed the impinging droplet successfully, and was robust against impalement. The water droplet in this case was 2.5 mm in diameter. The liquid-impregnated surface 504 was a microtextured surface containing an impregnating liquid of hexadecane in an array of 10 μm square posts of silicon, spaced 25 μm apart.

Figure 6A:
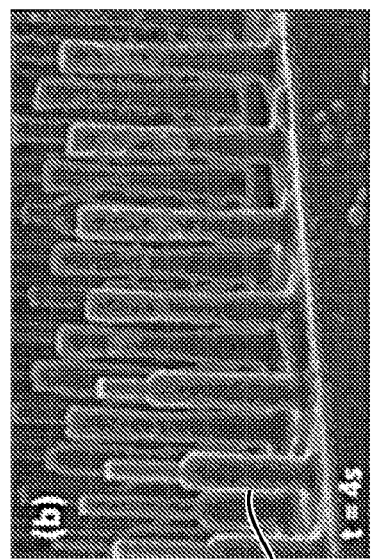
FIGS. 6a-6d include a sequence of ESEM images showing the formation of frost on a gas-impregnated non-wetting surface, in accordance with certain embodiments of the invention.
Figure 6B:
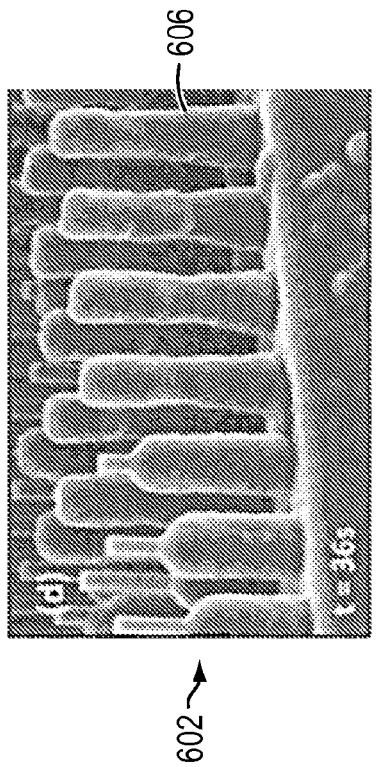
Figure 6C:
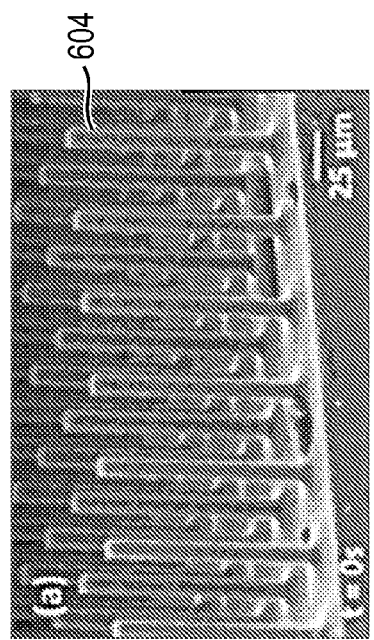
Figure 6D:
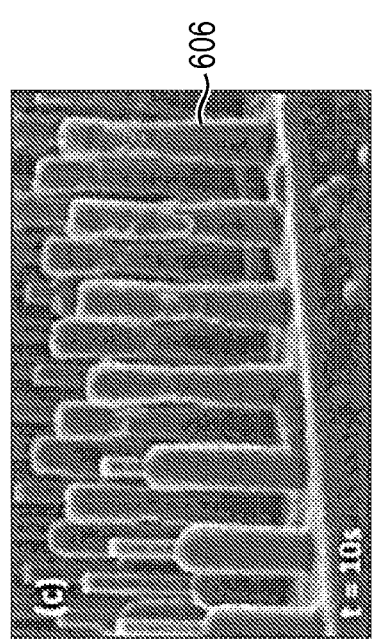

FIGS. 6a-6d include a sequence of ESEM images showing the formation of frost on a gas-impregnated, superhydrophobic surface 602, in accordance with certain embodiments of the invention. The superhydrophobic surface 602 included an array of hydrophobic square posts 604 with width, edge-to-edge spacing, and aspect ratio of 15 μm, 30 μm, and 7, respectively. FIG. 6a depicts a dry surface (i.e., no frost), while FIGS. 6b-6d depict the formation of frost 606 on the surface. The intrinsic water contact angle of the hydrophobic coating on the posts was 110°. The surface was maintained at a temperature of −13° C. by means of a cold stage accessory of the ESEM. At the beginning of the experiment, the chamber pressure was maintained at ~100 Pa, well below the saturation pressure to ensure a dry surface. The vapor pressure in the chamber was then slowly increased until frost nucleation was observed. Frost nucleation and growth occurred without any particular spatial preference on all of the available area, including post tops, sidewalls, and valleys, due to the uniform intrinsic wettability of the surface.

Figure 7A:
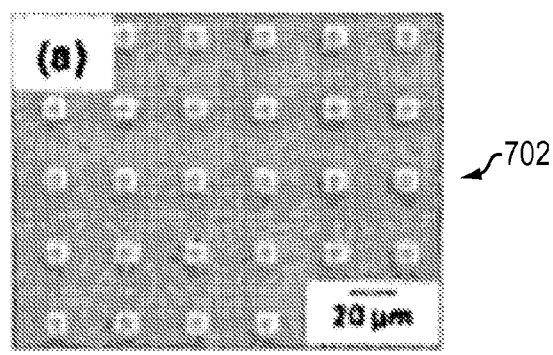
FIG. 7a-7c include images from droplet impact testing on dry and frosted superhydrophobic surfaces, in accordance with certain embodiments of the invention.
Figure 7B:
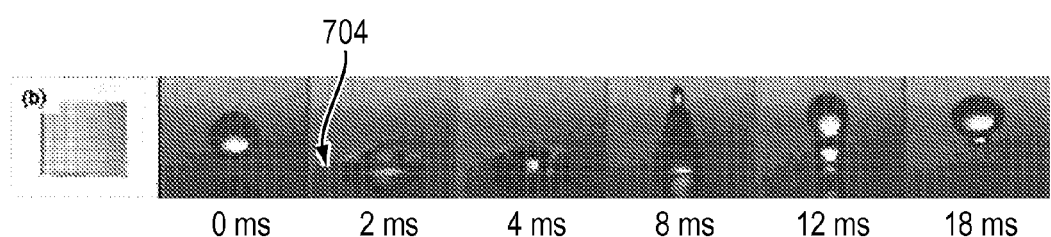
Figure 7C:
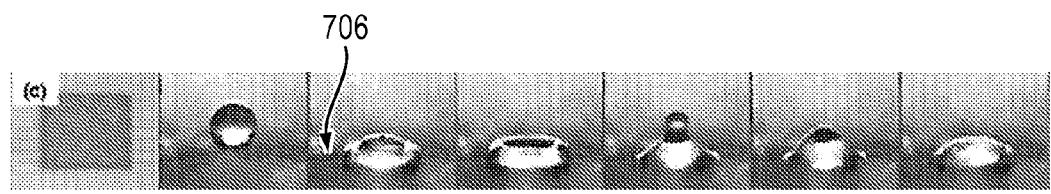

FIG. 7a-7c depict images from droplet impact testing on dry and frosted superhydrophobic surfaces, in accordance with certain embodiments of the invention. The testing was conducted using water droplets having a radius of 1 mm and impacting the surface at a velocity of 0.7 m/s. FIG. 7a is a top view SEM image of the representative Si post array surface 702 having a width, edge-to-edge spacing, and aspect ratio of 10 μm, 20 μm, and 1, respectively. FIG. 7b includes a sequence of high-speed video images of droplet impact on a dry surface 704. As depicted, the droplet recoils from the surface 704, as the anti-wetting capillary pressure is greater than the dynamic wetting pressures. FIG. 7c includes a sequence of high-speed video images of droplet impact on a surface covered with frost 706. The results show that frost 706 alters the wetting properties of the surface, making the surface hydrophilic, and causing Cassie-to-Wenzel wetting transition of the impacting drop, subsequent pinning, and formation of "Wenzel" ice on the surface.

Figure 8:
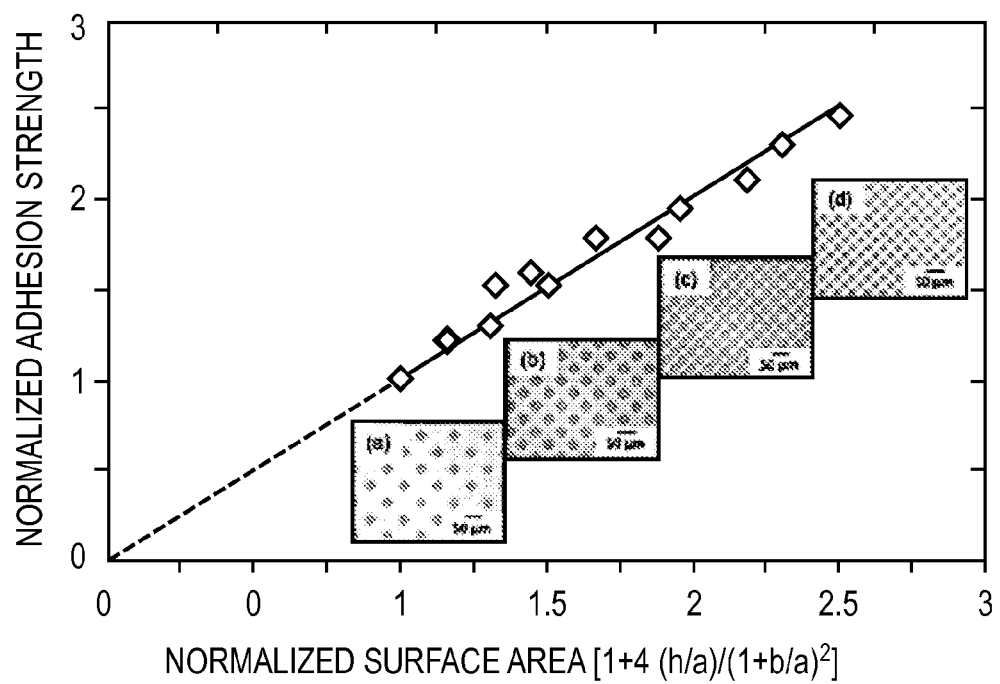
FIG. 8 is a plot of measured normalized ice adhesion strength versus normalized surface area, in accordance with certain embodiments of the invention.

FIG. 8 is a plot of measured normalized ice adhesion strength versus normalized surface area, in accordance with certain embodiments of the invention. Normalized ice adhesion strength is the ice adhesion strength as measured with textured surfaces divided by the ice adhesion strength as measured with a smooth surface. Normalized surface area is the total surface area normalized by the projected area. As the figure indicates, the normalized ice adhesion strength was found to increase with normalized surface area and shows a strong linear trend. The best linear fit to the data (solid line, correlation coefficient R2=0.96) has a slope of one and passes through the origin (extrapolated using a dashed line), indicating that ice is contacting all available surface area, including the sides of the posts. The interlocking of the ice with the textured surface results in increased adhesion strength. Insets (a)-(d) in this figure are top view optical images of representative replicated PDMS post arrays from sparse to dense spacing (a=15 μm, h=10 μm, b=45, 30, 15, and 5 μm, respectively, where a, h, and b are dimensions shown in FIGS. 2C and 2D) showing the excellent quality of replication.

Roll-off experiments were conducted using a Rame-hart Goniometer with a tilting stage to measure the drop-shedding properties of an octadecyltrichlorosilane-treated silicone post surface (with 25 μm post spacing) impregnated with hexadecane. A roll-off angle of 1.7°±0.1° was measured for a 7 μl drop. Advancing and receding contact angles were 98°±1° and 97°±1°, respectively. This very low roll-off angle allows the liquid-impregnated surface to shed liquid droplets quickly (e.g., before they freeze in freezing rain applications).

Figure 9:
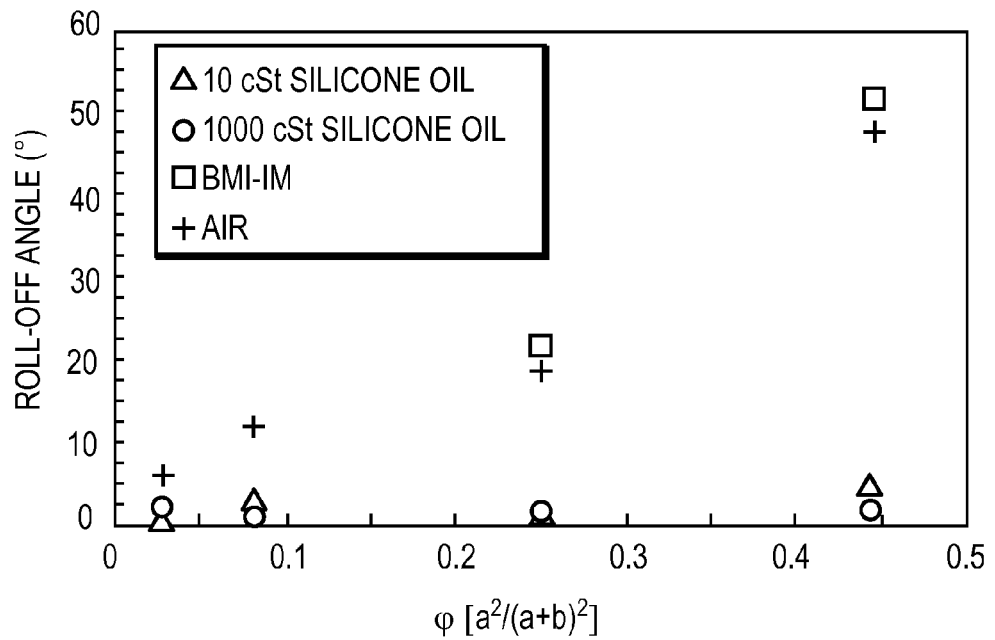
FIG. 9 is a plot of roll-off angle versus surface solid fraction, in accordance with certain embodiments of the invention.
Figure 10:
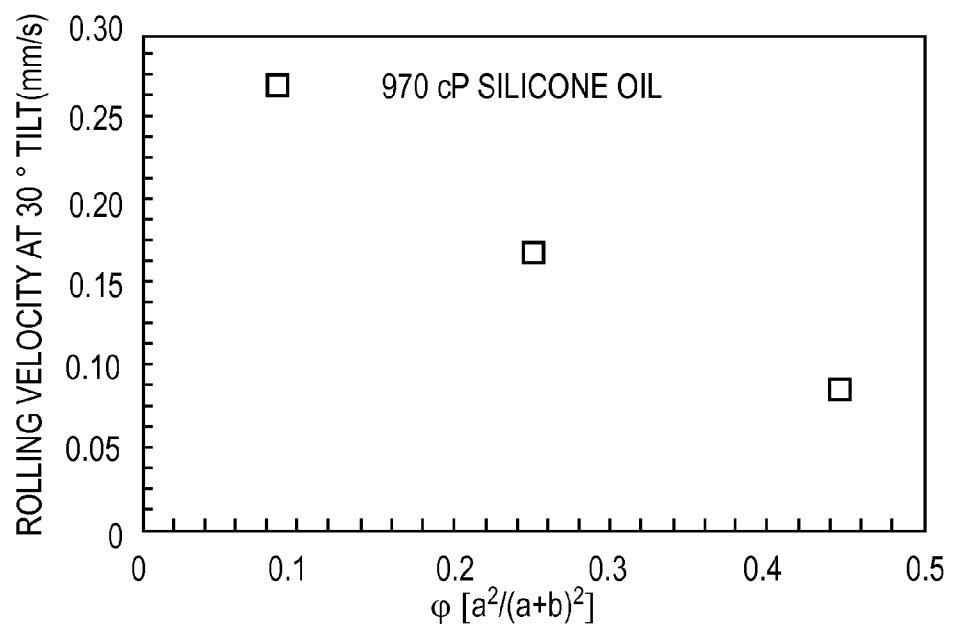
FIGS. 10, 11, and 12 are plots of droplet rolling velocity on a tilted liquid-impregnated surface, in accordance with certain embodiments of the invention.

FIGS. 9 and 10 show experimental measurements of water droplet mobility on liquid impregnating surfaces. FIG. 9 is a plot of roll-off angle α (or the tilt angle) as a function of surface solid fraction φ, for four different fluids impregnated in the surface (feature dimensions a and b are as shown in FIG. 2D). Note that the "Air" case represents a conventional superhydrophobic surface (i.e., a gas-impregnated surface). The plot shows that roll-off angle α was very small (less than 5°) for silicone oils and was not significantly affected by solid fraction ϕ. For an ionic liquid (i.e., BMI-IM), which does not wet the impregnating surface completely, the roll-off angle α was relatively higher, almost equal to the air case, and increased with solid fraction ϕ due to increased pinning of the droplet on microposts. This is likely because an increase of solid fraction ϕ means more microposts in a unit area. FIG. 10 is a plot of water droplet sliding velocity $v_o$, for a test in which the surface was tilted at 30°, as a function of solid fraction ϕ for 1000 cSt silicone oil. The plot shows that sliding velocity $v_o$ decreased when the solid fraction ϕ increased, due to increased pinning.

Figure 11:
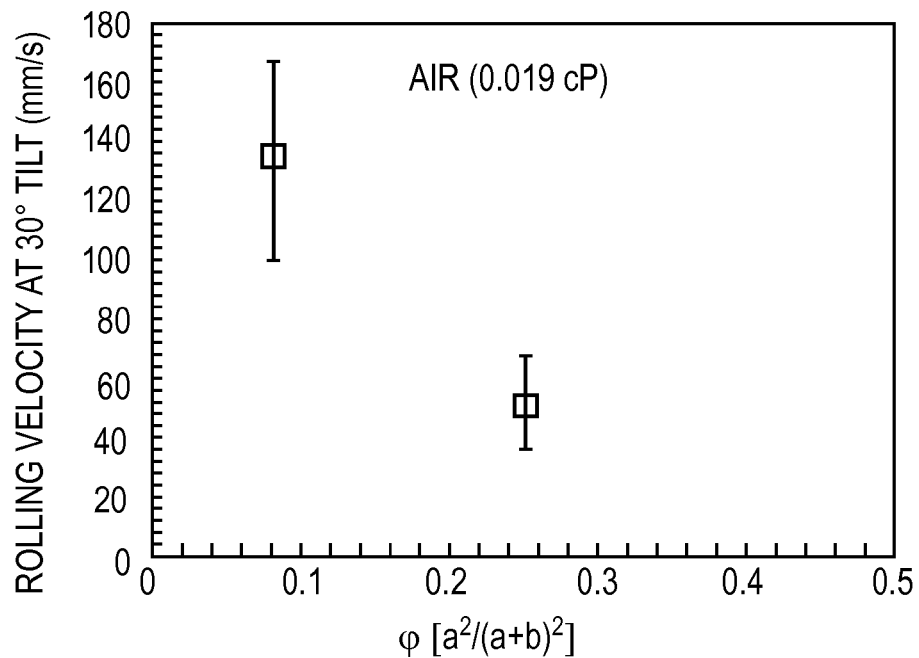
Figure 12:
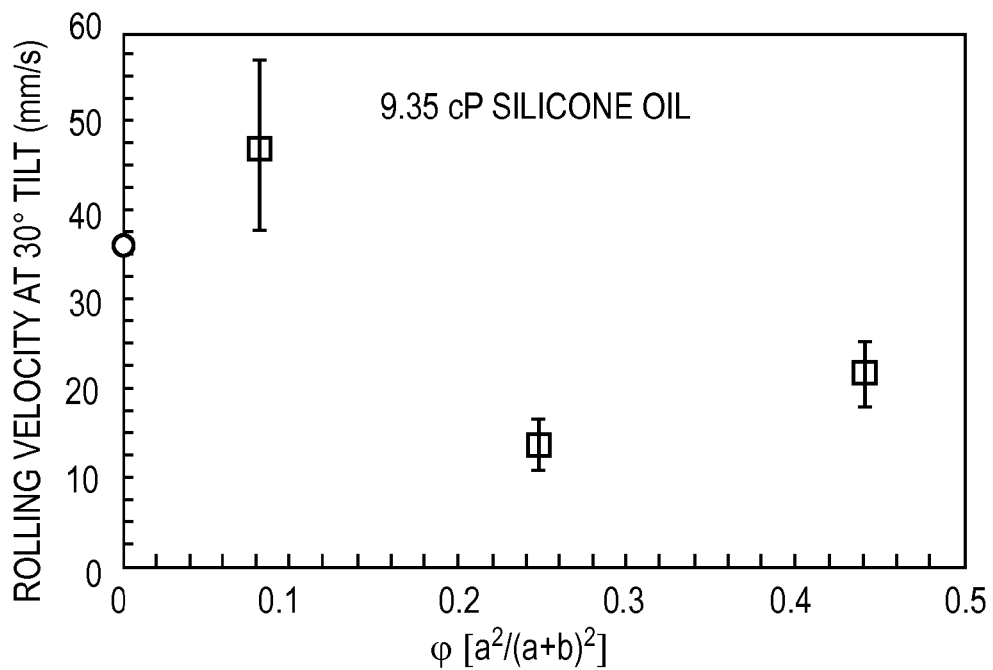

FIGS. 11 and 12 show additional experimental measurements of water droplet sliding velocity $v_o$ for different impregnating fluids having different viscosities, when the surface was tilted to 30°. The figures show that sliding velocity $v_o$ with air is higher than with silicone oils, but sliding velocity $v_o$ has the same decreasing trend with solid fraction ϕ due to increased pinning FIG. 12 is a plot of sliding velocity $v_o$ as a function of solid fraction ϕ for 10 cSt silicone oil. The plot shows that the magnitude of sliding velocity $v_o$ is higher than with 1000 cSt but less than with air. The trend with solid fraction ϕ remains the same. The measurements in FIGS. 10 and 12 show that droplet mobility (e.g., sliding velocity $v_o$) increases as the viscosity of the impregnating liquid decreases. This suggests that the greatest mobility is likely achieved low viscosity impregnating fluids, such as air.

In one experiment, the viscosity of the impregnating liquid was varied to determine the influence of viscosity on droplet impingement. The surface used for the test included silicon microposts (10×10×10 μm) with a post spacing of 10 μm. When the viscosity of the impregnating liquid was 10 cSt, the impinging water droplet was able to bounce-off the liquid-impregnated surface. By contrast, when the viscosity of the impregnating liquid was 1000 cSt, the impinging water droplet remained on the surface (i.e., it did not bounce off the surface). Unlike a similar impingement experiment conducted with a gas-impregnated surface, however, the droplet was able to subsequently roll-off the surface, although the sliding velocity was low.

Figure 13:
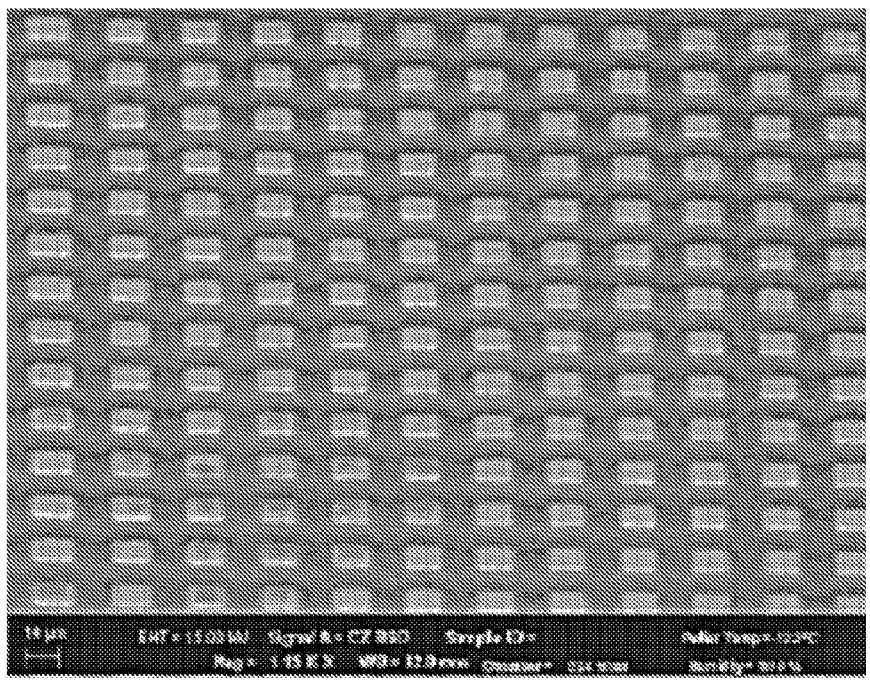
FIGS. 13 and 14 include Environmental SEM (ESEM) images of frost nucleation on micropost surfaces impregnated with silicone oil, in accordance with certain embodiments of the invention.
Figure 14:
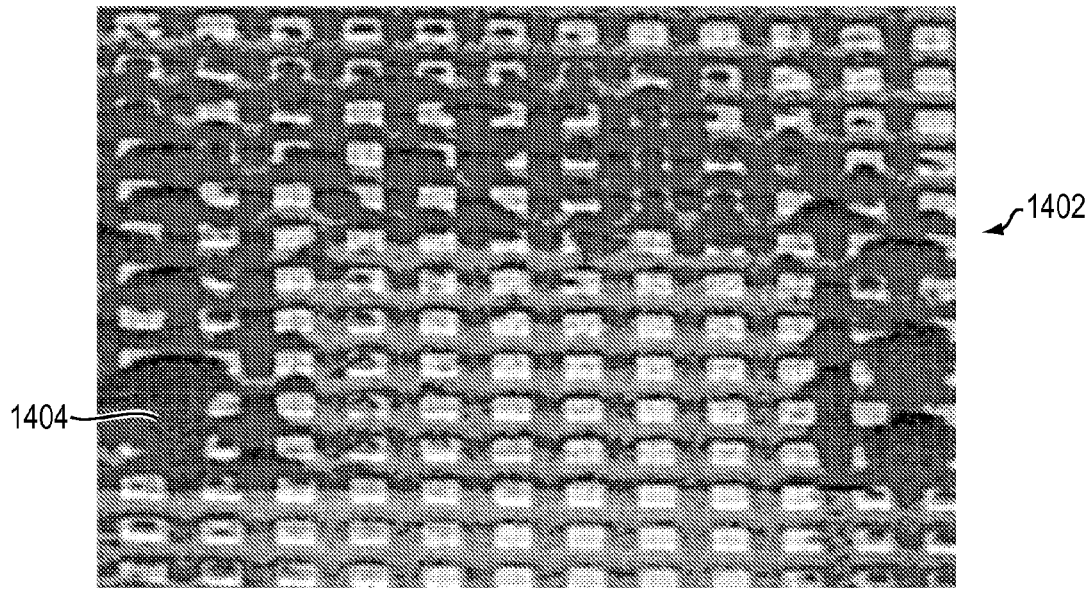

FIGS. 13 and 14 include Environmental SEM (ESEM) images of frost nucleation on micropost surfaces impregnated with silicone oil. FIG. 13 shows a surface 1402 before nucleation was triggered. FIG. 14 shows a surface 1404 during nucleation and indicates that frost 1306 had the tendency to nucleate on the micropost tops.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An article comprising a liquid-impregnated surface, said surface comprising a plurality of micro-scale and/or nano-scale solid features spaced sufficiently close to stably contain an impregnating liquid therebetween, said surface stably containing said impregnating liquid between said solid features, wherein said impregnating liquid fills the volume between said solid features, wherein said impregnating liquid is held in place between said plurality of features regardless of orientation of said surface, wherein 0<ϕ<0.5, where ϕ is the surface area fraction of said surface non-submerged by said impregnating liquid, and wherein said surface is a textured surface and said solid features are engineered protrusions of said textured surface.

2. The article of claim 1, wherein said impregnating liquid has viscosity at room temperature no greater than about 1000 cP.

3. The article of claim 1, wherein said impregnating liquid has vapor pressure at room temperature no greater than about 20 mm Hg.

4. The article of claim 2, wherein said impregnating liquid has a viscosity at room temperature on the order of 10 cSt or less.

5. The article of claim 1, wherein the plurality of solid features has a feature-to-feature spacing from about 1 micrometer to about 100 micrometers.

6. The article of claim 1, wherein the plurality of solid features has a feature-to-feature spacing from about 5 nanometers to about 1 micrometer.

7. The article of claim 1, wherein the plurality of solid features comprises hierarchical structures.

8. The article of claim 7, wherein the hierarchical structures are micro-scale features that comprise nano-scale features thereupon.

9. The article of claim 1, wherein the solid features have height no greater than about 100 micrometers.

10. The article of claim 1, wherein the solid features comprise at least one member selected from the group consisting of a spherical particle, a nanoneedle, a nanograss, and a random geometry feature that provides surface roughness.

11. The article of claim 1, wherein the impregnating liquid comprises a member selected from the group consisting of silicone oil, a perfluorocarbon liquid, a perfluoroFluorinated vacuum oil, a fluorinated coolant, an ionic liquid, a fluorinated ionic liquid that is immiscible with water, a silicone oil comprising PDMS, a fluorinated silicone oil, a liquid metal, an eletro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, bodily fluid.

12. The article of claim 1, wherein the article is a part of or coating of a pipeline, and wherein the liquid-impregnated surface inhibits the formation of hydrate thereupon and/or enhances the slippage of fluid flowing thereupon.

13. The article of claim 1, wherein the liquid-impregnated surface inhibits corrosion.

14. The article of claim 1, wherein the liquid-impregnated surface is an anti-fouling surface that resists adsorption of debris thereupon.

15. The article of claim 1, wherein 0<ϕ≤0.25.

16. The article of claim 1, wherein said impregnating liquid is held in place within said plurality of solid features regardless of contact of said liquid-impregnated surface with a liquid different from said impregnating liquid.

17. The article of claim 1, wherein the plurality of micro-scale and/or nano-scale solid features comprises randomly-spaced features.

18. The article of claim 1, wherein the plurality of micro-scale and/or nano-scale solid features are evenly spaced.

\* \* \* \* \*